(12) United States Patent
Schumacher

(10) Patent No.: US 7,931,012 B2
(45) Date of Patent: Apr. 26, 2011

(54) METHOD FOR IDENTIFYING A FUEL QUALITY AND FOR OPERATING AN INTERNAL COMBUSTION ENGINE AND AN ENGINE CONTROL UNIT

(75) Inventor: Herbert Schumacher, Gerlingen (DE)

(73) Assignee: Robert Bosch GmbH, Stuttgart (DE)

( * ) Notice: Subject to any disclaimer, the term of this patent is extended or adjusted under 35 U.S.C. 154(b) by 229 days.

(21) Appl. No.: 12/336,712

(22) Filed: Dec. 17, 2008

(65) Prior Publication Data

US 2009/0198433 A1     Aug. 6, 2009

(30) Foreign Application Priority Data

Feb. 4, 2008   (DE) .................. 10 2008 007 395

(51) Int. Cl.
*F02G 5/00*          (2006.01)
(52) U.S. Cl. .................. 123/549; 123/145 A; 123/435

(58) Field of Classification Search ............... 123/304, 123/549, 555, 494, 145 A, 435; 701/103, 701/113; 73/35.02
See application file for complete search history.

(56) References Cited

U.S. PATENT DOCUMENTS

| | | | | | |
|---|---|---|---|---|---|
| 4,287,862 | A | * | 9/1981 | Noguchi et al. | 123/310 |
| 4,463,729 | A | * | 8/1984 | Bullis et al. | 123/478 |
| 4,760,830 | A | * | 8/1988 | Bullis et al. | 123/501 |
| 5,771,857 | A | * | 6/1998 | Willi | 123/305 |
| 2002/0166515 | A1 | * | 11/2002 | Ancimer et al. | 123/27 R |

* cited by examiner

*Primary Examiner* — John T Kwon
(74) *Attorney, Agent, or Firm* — Kenyon & Kenyon LLP

(57) ABSTRACT

A method for identifying the fuel quality and for operating an internal combustion engine, as well as an engine control unit, in which the temperature of at least one sheathed-element glow plug of the engine is controlled, an engine response after a temperature change is compared to an engine response before the temperature change, and from the result of this comparison, the fuel quality is derived.

10 Claims, No Drawings

METHOD FOR IDENTIFYING A FUEL QUALITY AND FOR OPERATING AN INTERNAL COMBUSTION ENGINE AND AN ENGINE CONTROL UNIT

BACKGROUND INFORMATION

Diesel engine applications, especially for passenger cars, at this time are not yet able to make adjustments, during current operation, that are dependent upon fuel quality. In markets having very great quality differences, such as in the USA, in response to poor Diesel quality, considerable deterioration may therefore occur in the emissions and in running smoothness, under certain circumstances. In the extreme case this leads to an unacceptable nuisance to the vehicle users because of the bad smell and the lack of running smoothness.

Mass-produced cylinder pressure sensors are now under development, which make combustion evaluation possible. New sheathed-element glow plugs made of ceramic enable ignition almost as frequently as desired during engine operation.

OBJECT OF THE INVENTION

It is an object of the present invention to provide a method, which makes it possible to identify the fuel quality in a simple, rapid and reliable manner, and which is also easily implementable and cost-effective. It is furthermore an object of the present invention to ensure the optimum operation of an internal combustion engine that is independent of the fuel quality.

DETAILED DESCRIPTION

This object is attained by a method for identifying the fuel quality in an internal combustion engine, in which the temperature of at least one sheathed-element glow plug of the engine is controlled, an engine response after a temperature change is compared to an engine response before the temperature change, and from the result of this comparison the fuel quality is derived.

One important aspect of the identification method according to the present invention is that, by controlling the sheathed-element glow plug, an ignition delay is able to be reduced or prolonged again, and the combustion behavior is able to be influenced substantially. This change in the combustion behavior is dependent upon the fuel quality. The glowing has an influence similar to a higher cetane number. The comparison of the engine response as a function of the glowing enables one to draw conclusions on the fuel quality and the selection of suitable application interventions.

Because of the relative comparison, requirements for accuracy on a cylinder pressure sensor, for instance, may be reduced, or the separation of the influence variables, such as the cetane number, the pre-injection quantity, the exhaust gas recirculation rate, etc., on the measuring signal may be simplified because a specified intervention on the inflammation is superposed.

It is provided in one advantageous specific embodiment of the present invention that the temperature of the sheathed-element glow plug is controlled by being switched on and off. This type of control is particularly simple to implement and supplies reliable results.

Conversely, a particularly simple determination of the engine behavior may be made by recording a pressure change and/or a rotational speed change. These values are usually already present on a vehicle bus, and may be picked off there.

The method is preferably used for null quantity calibration of the internal combustion engine, since, particularly in null quantity calibration, a long ignition delay without glowing permits one to detect the smallest throughput quantities only with difficulty.

The above temperature control may basically be carried out on a hot engine, for example, to compensate for fuel quality deficiencies, in order to improve the operating behavior, or in order to permit quantity equalization functions to work more precisely.

What is preferred, however, is to use the method at operating points that are highly dependent upon fuel quality, such as at low load and/or a cold engine, for which a clear improvement in running smoothness comes about.

The above object is also attained by a method for operating an internal combustion engine in which a fuel quality is detected according to the present invention, and a quality-dependent correction characteristics map for controlling the engine is selected and interpreted.

One important aspect of the operating method according to the present invention is that an optimum operation of the internal combustion engine is assured in each case independently of the fuel quality.

One preferred refinement of the method according to the present invention relates to the correction characteristics map, which includes control parameters of a Common Rail System (CRS) engine. This makes available as possible control interventions all the usual application parameters of this engine.

The above object is additionally attained by an engine control unit for an internal combustion engine, having a control unit for controlling the temperature of at least one sheathed-element glow plug of the engine and having a recording unit for recording the engine response, the unit furthermore including a detection unit for the fuel quality which is developed for the comparison of an engine response that is different from one that is dependent on the temperature control, and for deriving a fuel quality based on this comparison.

One important aspect, in this context, of the engine control unit according to the present invention, is that only slight modifications of existing units are required in order to identify the fuel quality in a simple and reliable manner.

It is provided in one advantageous specific embodiment of the present invention that the engine control unit also includes a compensation unit for compensating for the fuel quality, which is developed for selecting and interpreting a correction characteristics map as a function of the fuel quality, for controlling the engine. With that, one is able to set the engine to the identified fuel quality. The cylinder pressure sensors and/or the ceramic sheathed-element glow plugs, that were mentioned, are not necessarily required.

Nevertheless, with the aid of a ceramic plug, particularly rapid temperature changes may be implemented, and with that, fuel quality may be identified especially rapidly.

As such, fuel quality is able to be identified by an engine control unit being present, which only requires the modifications according to the present invention to be made. In addition, because of correction characteristics maps, the running smoothness of the engine may be substantially improved even in the case of poor fuel. The present invention makes possible, in this instance, reducing the requirements on cylinder pressure sensors or replacing them by simpler sensors.

What is claimed is:

1. A method for identifying a fuel quality in an internal combustion engine, comprising:

controlling a temperature of at least one sheathed-element glow plug of the engine;

comparing an engine response after a temperature change to an engine response before the temperature change; and from a result of the comparison, deriving a fuel quality.

2. The method according to claim 1, wherein the temperature of the sheathed-element glow plug is controlled by switching the plug on and off.

3. The method according to claim 1, further comprising recording at least one of a pressure change and a rotational speed change for determining the engine response.

4. The method according to claim 1, further comprising:

based on the derived fuel quantity, determining a null quantity for the internal combustion engine.

5. The method according to claim 1, wherein the method is performed in a cold engine mode of operation of the internal combustion engine.

6. A method for operating an internal combustion engine, comprising:

controlling a temperature of at least one sheathed-element glow plug of the engine;

comparing an engine response after a temperature change to an engine response before the temperature change;

from a result of the comparison, deriving a fuel quality; and selecting and interpreting a quality-dependent correction characteristics map for controlling the engine.

7. The method according to claim 6, wherein the correction characteristics map includes control parameters of a Common Rail System (CRS) engine.

8. An engine control unit for an internal combustion engine, comprising:

a control unit for controlling a temperature of at least one sheathed-element glow plug of the engine;

a recording unit for recording an engine response; and a detection unit for a fuel quality configured to:

compare engine parameters that change in response to the temperature control; and derive a fuel quality based on the comparison.

9. The control unit according to claim 8, further comprising a compensation unit for compensating for the fuel quality, which is developed for selecting and interpreting a correction characteristics map as a function of the fuel quality, for controlling the engine.

10. The control unit according to claim 8, wherein the sheathed-element glow plug is a ceramic plug.

* * * * *